(12) United States Patent
Jans et al.

(10) Patent No.: US 7,857,118 B2
(45) Date of Patent: Dec. 28, 2010

(54) PRODUCT ORIENTING APPARATUS

(75) Inventors: René Jans, Eindhoven (NL); Dirk Mermans, Retie (BE)

(73) Assignee: J&L Group International, LLC (JLGI), Keithville, LA (US)

(*) Notice: Subject to any disclaimer, the term of this patent is extended or adjusted under 35 U.S.C. 154(b) by 294 days.

(21) Appl. No.: 12/081,146

(22) Filed: Apr. 11, 2008

(65) Prior Publication Data
US 2009/0039592 A1 Feb. 12, 2009

(30) Foreign Application Priority Data
Apr. 11, 2007 (EP) .................. 07007410

(51) Int. Cl.
*B65G 47/244* (2006.01)
(52) U.S. Cl. .................. 198/411; 198/779; 198/373
(58) Field of Classification Search .......... 198/779, 198/373, 410, 411, 415, 416, 414
See application file for complete search history.

(56) References Cited

U.S. PATENT DOCUMENTS

| | | | |
|---|---|---|---|
| 495,683 A * | 4/1893 | Rigby | 198/414 |
| 3,828,917 A * | 8/1974 | Oestergren | 198/412 |
| 4,519,493 A * | 5/1985 | Dyer | 198/414 |
| 5,000,305 A | 3/1991 | Lucas | |
| 5,238,099 A * | 8/1993 | Schroeder et al. | 198/456 |
| 5,293,984 A | 3/1994 | Lucas | |
| 7,021,454 B2 * | 4/2006 | Ozaki et al. | 198/779 |
| 7,419,052 B2 * | 9/2008 | Ozaki et al. | 198/853 |
| 2003/0221932 A1 | 12/2003 | Costanzo | |
| 2006/0011453 A1 | 1/2006 | Sedlacek | |
| 2006/0260917 A1 | 11/2006 | Ozaki et al. | |

FOREIGN PATENT DOCUMENTS

| EP | 1 367 009 A1 | 12/2003 |
|---|---|---|
| EP | 1 619 144 A1 | 1/2006 |
| EP | 1 726 541 A1 | 11/2006 |

OTHER PUBLICATIONS

Search Report of European Patent Office relating to EP 07007410.9 dated Oct. 19, 2007.

* cited by examiner

*Primary Examiner*—Gene Crawford
*Assistant Examiner*—William R Harp
(74) *Attorney, Agent, or Firm*—Bacon & Thomas, PLLC

(57) ABSTRACT

A product orienting apparatus for orienting a product according to the present invention comprises a table comprising a rotatable device. The table has a table surface comprising at least a first surface area being provided by the rotatable device. The device is rotatable about an axis substantially perpendicular to the table surface. The table also has an array of substantially identical spherical rollers, each spherical roller being suitable for contacting the product at a first contacting point of the spherical roller and for contacting the table surface with a second contacting point of the spherical roller. The array of spherical rollers comprises a first group of spherical rollers contacting the surface area of the device with their second contacting point thereby enabling to convert a rotation of the device into rotation of a product contacting the spherical rollers of the first group of spherical rollers. The table furthermore has a plate having an aperture encompassing the rotatable device. The table surface comprises a second surface area provided by the plate. The second surface area is substantially coplanar with the first surface area.

13 Claims, 3 Drawing Sheets

PRODUCT ORIENTING APPARATUS

TECHNICAL FIELD OF THE INVENTION

The present invention relates to product orienting apparatus for orienting a product, in particular stacks of sheets of material, such as sheets of paper, cardboard, plastic and alike as well as to methods of orienting using the device.

BACKGROUND OF THE INVENTION

At present, many products are produced using production lines which are working continuously. Frequently products moving along the production line by means of conveyor belts need to be repositioned correctly with respect to machines, so that the product may be required to be rotated about an axis perpendicular to the plane in which the product moves through the production line.

Such orientation is often done by using pushers or contacting devices. The product which is moved in a given direction, is prevented to move along at one of its sides, i.e. the right side or the left side with respect to the moving direction. As the right and left side of the product do not move at the same speed, a rotation about an axis perpendicular to the direction of movement is obtained.

Such mechanisms require that the product be contacted at at least one of its sides, and usually do not provide predictable movements of the product, hence necessitate additional manipulations.

Alternatively the product is clamped by a clamping means and manipulated, i.e. oriented, by rotating the clamping means.

Both mechanisms necessitate interaction of a machine part with the sides of the product not in contact with the conveyor belt. Such contact may, however, lead to damage on the sides of the product not contacting the conveyor belt. In particular, in case the product is a stack of sheet material, such as stacks of paper, cardboard or plastic sheets, the contact with the sides of the stack may cause misalignment of the stack and/or damage at the border of the sheets.

SUMMARY OF THE INVENTION

It is an object of the present invention to provide good apparatus or methods for orienting a product, in particular stacks of sheets of material, such as sheets of paper, cardboard, plastic and alike. The apparatus and the method according to the present invention avoid contact of machine parts with the sides of the product, e.g. stack of sheet material, which sides are not contacting the transporting means such as conveyor belts in the production line.

According to a first aspect of the present invention, a product orienting apparatus for orienting a product is provided. The apparatus comprises:

A table comprising a rotatable device, the table having a table surface comprising at least a first surface area being provided by the rotatable device, the rotatable device being rotatable about an axis substantially perpendicular to the table surface. The table furthermore comprises a plate having an aperture encompassing the rotatable device, the table surface comprising a second surface area provided by the plate. The second surface area is substantially coplanar with the first surface area.

An array of substantially identical spherical rollers, each spherical roller being suitable for contacting the product at a first contacting point of the spherical roller and for, simultaneously, contacting the table surface with a second contacting point of the spherical roller. The array of spherical rollers comprises a first group of spherical rollers contacting the surface area of the rotatable device with their second contacting point thereby enabling to convert a rotation of the rotatable device into rotation of a product contacting the spherical rollers of the first group of spherical rollers at their first contacting points.

The table may preferably have a substantially planar table surface. The rotatable device may preferably be a disc.

The second contacting point of a spherical roller will usually be substantially diametrically opposed to the first contacting point, with respect to the centre of the spherical roller.

The first group of spherical rollers contacting the surface area of the device with their second contacting point thereby enable to convert a rotation of the device into a rotation of the spherical rollers itself, which rotation of the spherical rollers is then converted into a rotation of a product contacting the spherical rollers of the first group of spherical rollers.

This is preferably done by keeping the centres of the spherical rollers in a fixed position relative to the axis of rotation of the device during rotation of the rotatable device.

According to some embodiments of the present invention, the apparatus furthermore may comprise a means for keeping the centres of the spherical rollers in a fixed position relative to the axis of rotation, more particularly relative to the longitudinal direction of the axis of rotation, of the device during rotation of the rotatable device. This keeping in a fixed position may be in any direction in a plane perpendicular to the axis of rotation. In embodiments of the present invention, this keeping in a fixed position may be in a direction parallel to the longitudinal direction of the axis of rotation. The latter means that in embodiments of the present invention no movement of the spherical rollers in the longitudinal direction of the axis of rotation takes place.

Such means may be a plate having apertures in which the spherical rollers are rotatably fixed. Alternatively, this may also be a conveyor belt.

In embodiments of the present invention, the spherical rollers may be used for assisting both in a translational movement and in a rotational movement.

According to some embodiments of the present invention, the apparatus may comprise a means to bring the product into contact with the first contacting point of at least part of the first group of spherical rollers having the second contacting point contacting the planar surface of the device when being brought into contact with the product According to some embodiments of the present invention, the apparatus furthermore may comprise a means to remove the product from at least part of the first group of spherical rollers.

According to some embodiments of the present invention, the spherical rollers may be part of a conveyor belt. Each spherical roller of the array of spherical rollers is rotatably retained in a cavity in the belt. The first and second contacting points of the spherical rollers are provided by salient parts of the spheres.

This conveyer belt may at the same time function as the means for keeping the centres of the spherical rollers in a fixed position relative to the axis of rotation of the device during rotation of the rotatable device, as the means to remove the product from and as the means to bring the product into contact with the first contacting point of at least part of the first group of spherical rollers having the second contacting point contacting the planar surface of the disc when being brought into contact with the product.

According to some embodiments of the present invention, the conveyor belt may be an endless belt moveable in a direction parallel to the table surface.

The conveyor belt may be a modular conveyor belt or may be an endless conveyor belt.

According to some embodiments of the present invention, the table further may comprise a plate having an aperture encompassing the rotatable device. The table surface comprises a second surface area provided by the plate which second surface area is substantially coplanar with the first surface area. The array of spherical rollers comprises a second group of the spherical rollers having their second contacting point for contacting the second surface area.

According to some embodiments of the present invention, the rotatable device may be a disc.

The product orienting apparatus according to this first aspect of the present invention has the advantage that the product, such as a stack of papers, cardboards or plastic, can be rotated without the need of any contact of force-exercising elements contacting the product at the sides of the product different from the side of the product used to contact transporting devices such as conveyer belts. The only contact the product has to make in order to be rotated, is contact with a first surface of at least part of the group of spherical rollers having a second surface positioned for contacting the planar surface of the rotatable device such as the disc. This is especially advantageous in case the product is a stack of sheets, such as a stack of sheets of paper, cardboard or plastic. The risk of damaging the border of the sheets is reduced. Similarly, the change or misalignment of the stack of sheets, due to displacement of one sheet versus the other or others due to sidewise forces, is avoided. The product is preferably a stack of sheets of paper, cardboard or plastic. The spherical rollers are preferably spheres or balls.

Furthermore, the product can be rotated without the table allowing the product to be rotated having to be lifted. Therefore, the product orienting apparatus according to embodiments of the present invention avoids the use of complicated lifting systems. In particular, embodiments of the present invention avoid the use of lifting systems for the rotating device.

The apparatus has also the advantage that the angle and speed of rotation can easily be set, adjusted or varied, by changing the angle of rotation of the rotatable device and the rotational speed of the rotatable device.

According to a second aspect of the present invention, a method to orient a product, in particular stacks of sheets of material such as paper, cardboard or plastic such as polymer or wood, is provided. The method comprises the steps of:

Providing a product orienting apparatus for orienting a product according to the first aspect of the present invention;

Bringing a product, to be rotated about an axis perpendicular to the table surface, into contact with the first contacting points of at least part of the first group of spherical rollers of the array;

Rotating the product in a first direction about an axis perpendicular to the table surface by rotating the rotatable device in a direction opposite to the first direction while the second surface area of the device contacts the second contacting points of at least part of the first group of spherical rollers.

The method has the advantage that no contact with the product other than the contact with the first contacting points of the spherical rollers at the lower side of the product is to be made for orientating, i.e. rotating the product. The orientation can be done accurately and the angle of rotation can be easily adjusted or modified according to the needs.

The method furthermore has the advantage that no lifting of the product needs to be performed for the rotation, which lifting could cause the product, in particular e.g. a stack of sheets of material such as paper, cardboard or plastic such as polymer or wood, to fall.

According to embodiments of the present invention, the spherical rollers may be part of a conveyor belt, each spherical roller of the array of spherical rollers being rotatably retained in a cavity in the belt. The first and second contacting points of the spherical rollers are provided by salient parts of the spheres. The product to be rotated, e.g. a stack of sheet material, is brought into contact with the first surface of at least part of the first group of spherical rollers by moving the conveyor belt in a direction parallel to the table surface.

According to embodiments of the present invention, the table may further comprise a plate encompassing the rotatable device. The table surface then comprises a second surface area provided by the plate, the second surface area being substantially coplanar with the first surface area. The array of spherical rollers comprises a second group of the spherical rollers arranged so as to have their second contacting point for contacting the second surface area. The conveyor belt may then be moved while the table surface contacts at least part of the array of spherical rollers.

According to embodiments of the present invention, the product may be a stack of sheet material, such as a stack of sheets of paper or cardboard or plastic such as polymer or wood.

According to a third aspect of the present invention, the apparatus according to the first aspect of the present invention may be used for rotating stacks of sheet material, e.g. stacks of sheets of paper or cardboard or polymer or wood.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The teachings of the present invention permit the design of improved methods and apparatus for orienting stacks of sheet material such as stacks of paper, cardboard, plastic or wood. Such apparatuses may advantageously be used in production lines of paper of cardboard sheets, where the apparatus is placed between a breaker, where a strip of paper or cardboard is partially cut and stacked, providing stacks of sheets of cardboard or paper being not completely separated from the preceding and following sheet along their leading and trailing edge, and a cutter, which removes a small part of the stack of sheets, which part comprises the trailing and leading edges of the stacked sheets.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
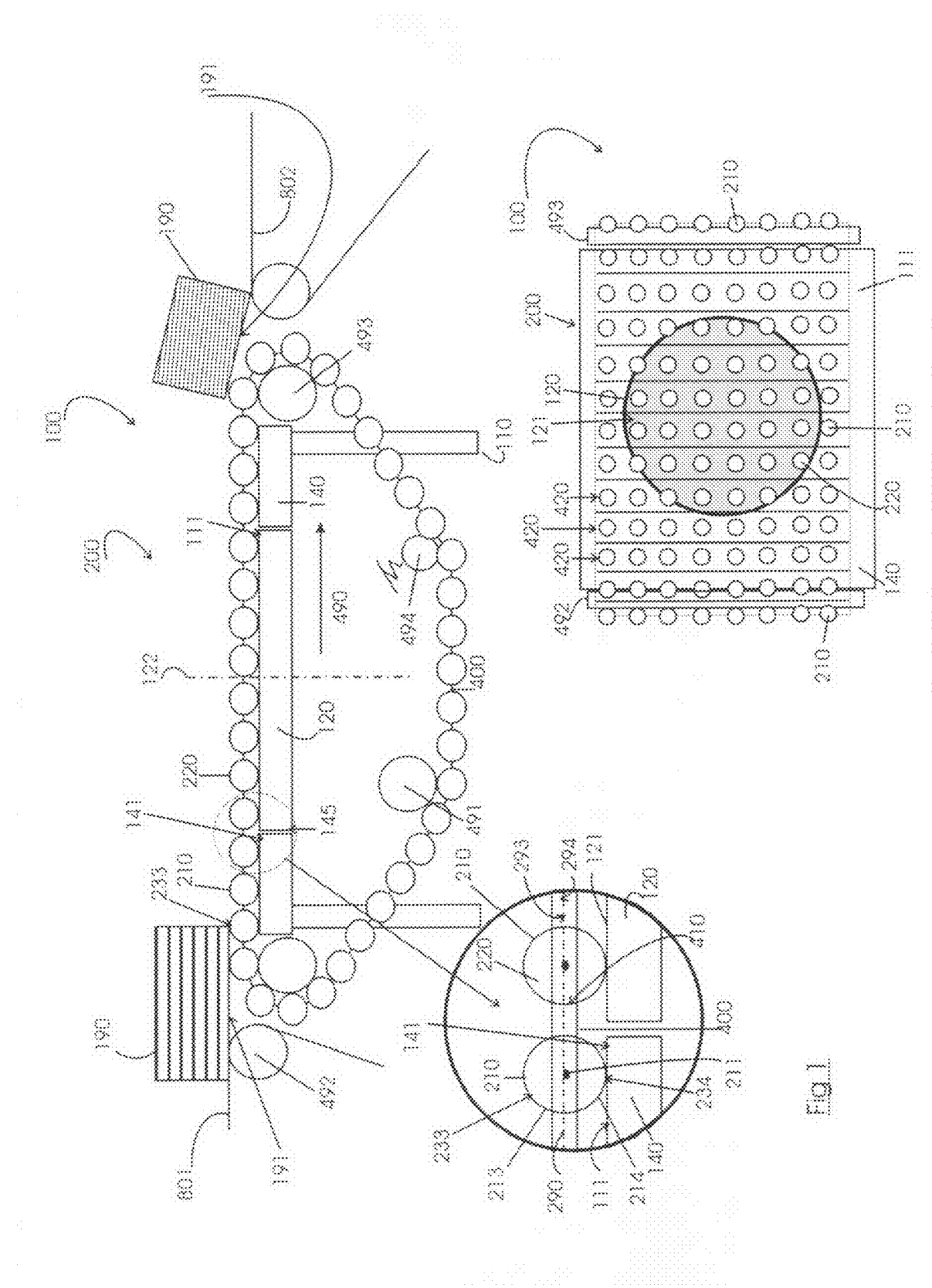
FIG. 1 is a schematical view of a vertical cross-section of a product orienting apparatus according to the first aspect of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

The following terms are provided solely to aid in the understanding of the invention.

The term "table" is to be understood as a device comprising a substantially planar surface suitable for carrying objects.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

A product orienting apparatus 100 for orienting a product 190 according to the first aspect of the present invention is shown in FIG. 1. The apparatus 100 comprises a table 110 having a substantially planar table surface 111, and having at least one surface area 121. The table 110 comprises a rotatable device, being a rotatable planar element such as a disc 120 providing this first surface area 121. The planar element, e.g. disc 120 is rotatable about an axis 122, which axis is substantially perpendicular to the substantially planar table surface.

The apparatus 100 comprises an array 200 of substantially identical spherical rollers 210, in this embodiment being spheres or balls.

Each spherical roller 210 is suitable for contacting the product 190 at a first contacting point 233 being part of a first surface 213 of the spherical roller. Each spherical roller 210 is suitable for contacting the table surface 111 with a second contacting point 234 of the spherical roller. This second contacting point 234 is provided by the second surface 214 of the spherical roller 210. The first surface 213 is the upper outer surface and the second surface 214 is the bottom outer surface of the spherical roller 210.

Each spherical roller 210 has a center 211. The spherical rollers 210 are positioned in the array 200 with their centers 211 coplanar according to a plane 290 substantially parallel to the table surface 111. The spherical rollers 210 of the array 200 of spherical rollers have their first surface 213 positioned at a first side 293 of the plane 290, which surface 213 provides the first contacting point 233 for contacting the product 190. Their second surface 214 is positioned at a second side 294 of the plane 290, the second side 294 being opposite to the first side 293 with respect to the plane 290. The surface 214 provides the second contacting point 234 for contacting the table surface 111. The second contacting point 234 is thus positioned at the other side 294 of the plane 290 and is substantially diametrically opposed to the first contacting point 233. This is to be understood as the line between first and second contacting point comprises the centre 211 of the spherical roller.

A first group of spherical rollers 220 of the array of spherical rollers 200 is provided for contacting the first surface area 121 of the table surface 111, e.g. the surface area provided by the disc, with their second contacting point 234, thereby enabling to convert a rotation of the disc 120 into rotation of the contacting spherical rollers 220

The conversion of rotation of the disc 120 into rotation of the contacting spherical rollers 220 and into a rotation of the product to be rotated present on the spherical rollers of the first group of spherical rollers, is preferably done by keeping the centres of the spherical rollers in a fixed position relative to the axis of rotation of the device during rotation of the rotatable device. This keeping in a fixed position is in particular in any direction in a plane perpendicular to the axis of rotation of the rotatable device. In particular embodiments this keeping in a fixed position may also be in the direction parallel to the axis of rotation of the rotatable device. In the embodiment of FIG. 1, this keeping in a fixed position is obtained by a conveyer belt 400 as will be discussed further. As an alternative, the spherical rollers may be rotatably fixed in a plate having apertures being cavities in which the spherical rollers are located.

The conversion of rotations, between rotatable device and spherical rollers and between spherical rollers and product, may be improved by proper choice of materials of the spherical roller and the disc, more particularly by properly selecting materials with appropriate mutual friction resistance. Preferably the first surface of the disc is provided with a rubber layer, more particularly a layer from natural rubber. The rubber layer may be provided on a supporting layer which may be e.g. plywood, such as plywood with a thickness of e.g. 20 mm, which plywood itself may be supported by a frame, e.g. a metal frame. The spherical rollers are preferably polymer spherical rollers or steel spherical rollers, such as polymer spherical rollers made from polyoxymethylene (POM)

The apparatus 100 further comprises a transport device, such as conveyer belt 801, to bring the product 190 into contact with the contacting point 233 of at least part 240 of the first group of spherical rollers 220 of the array 200 of spherical rollers 210.

Figure 2:
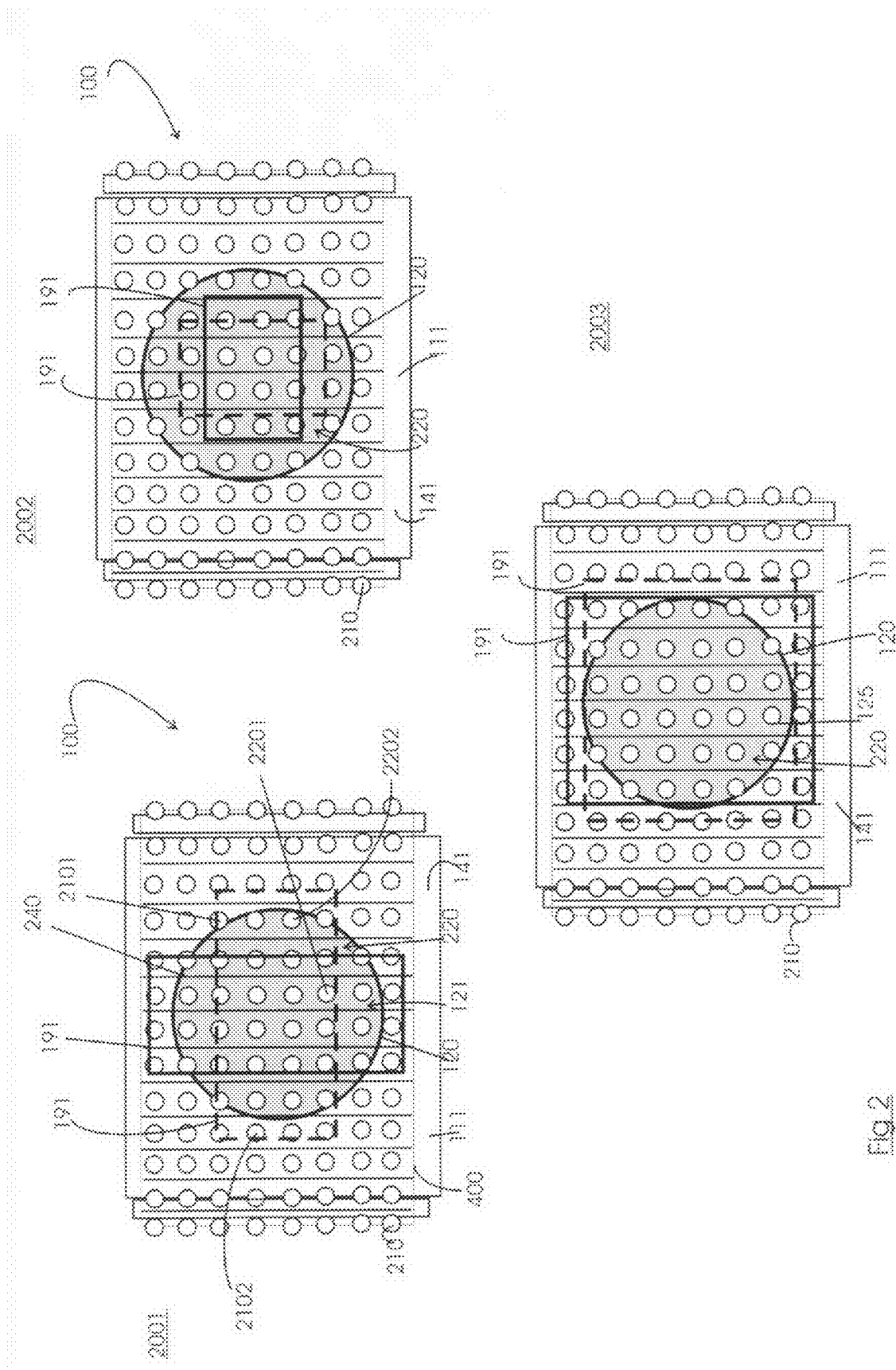
FIG. 2 is a schematical view of possible arrangements of a product on an array of spherical rollers, present on a rotatable device being a disc.

As best shown in FIG. 2, it was found that by bringing the product to be rotated into contact with the first contacting points 233 of at least part 240 of the first group of spherical rollers 220 of the array 200 of spherical rollers 210, and by rotating the disc in a first direction, say clockwise, the product having contact with the first contacting points 233 of at least part 240 of the first group of spherical rollers 220 of the array 200 of spherical rollers 210, rotates in the opposite direction, say counter-clockwise, on the spherical rollers 210. The conversion of a rotation of the disc 120 into rotation of the contacting spherical rollers 220, provokes a conversion of a rotation of the contacting spherical rollers 220 into rotation of the product. It is understood that the friction coefficient between product and spherical rollers is to be sufficient to provoke this conversion. A suitable material for the spherical rollers may e.g. be polymer or steel, such as rollers provided from POM. These materials were found to be suitable for most products, in particular in case the product 190 is a stack of sheets of paper, cardboard or plastic.

It has been found that bringing the product to be rotated into contact with the first contacting points 233 of at least part 240 of the first group of spherical rollers 220 of the array 200 of spherical rollers 210 is sufficient to provoke the rotation of the product. Depending on the dimensions of the side 191 of the product 190, the first contacting points 233 of all or only a part of the first group of spherical rollers 220 of the array 200 of spherical rollers 210 is contacted. Also dependent on the dimensions of the side 191 of the product 190, one or more spherical rollers 210 of the array of spherical rollers not being part of the first group of spherical rollers may be contacted during rotation by the product 190.

Some examples are shown in FIG. 2. In example 2001, before rotation, the side 191 of the product 190 (the profile of which in rotation direction before rotation is shown in full lines), which side is hereafter referred to as the lower side 191, contacts the spherical rollers 2201, being only a part of the first group of spherical rollers 220 of the array 200 of spherical rollers 210. Spherical rollers 2202 before rotation of product 190 are not in contact with the lower side. The lower side 191 of the product further contacts some spherical rollers 2101 of the array of spherical rollers not being part of the first group of spherical rollers before and during rotation.

The spherical rollers in contact with the product may be used for imparting a translational movement to the product.

After rotation (the product profile in rotation direction after rotation is shown in dashed lines), a similar situation is obtained, though some spherical rollers 2202 of the first group of spherical rollers 220 of the array of spherical rollers 200 which did not contact the lower surface prior to rotation, do make contact now. Others of the first group of spherical rollers of the array of spherical rollers, which were contacting the lower side, do not contact the lower side anymore. Similarly, some spherical rollers 2102 of the array of spherical rollers not being part of the first group of spherical rollers may become contacted; others may loose their contact with the lower side of the product during rotation.

As a rule of thumb, it was found that at least 50% of the spherical rollers contacting the lower side of the product should preferably be part of the first group of spherical rollers 220 of the array 200 of spherical rollers 210, which are driven by rotation of the disc.

In example 2002, before rotation and after rotation, the lower side 191 of the product 190 (the profile of which in rotation direction is shown in full lines before rotation and in dashed line after rotation), are only contacted by spherical rollers being a part of the first group of spherical rollers 220 of the array 200 of spherical rollers 210.

In example 2003, before rotation and after rotation, the lower side 191 of the product 190 (the profile of which in rotation direction is shown in full lines before rotation and in dashed line after rotation), contacts all spherical rollers of the first group of spherical rollers 220 of the array 200 of spherical rollers 210.

As shown in FIG. 1, the spherical rollers may be part of a conveyor belt 400. Each spherical roller 210 of the array of spherical rollers is rotatably retained in a cavity 410 in the belt. The upper 213 and lower 214 surface of the spherical rollers 210, thus the first contacting point 233 and the second contacting point 234, are provided by salient parts of the spheres. The conveyor belt 400 is a modular conveyor belt, comprising linked modules 420. Each module 420 preferably comprises a number of spherical rollers. The conveyor belt 400 is moveable in a direction 490 parallel to the plane 290, being the translation direction.

The conveyor belt 400 may be driven by appropriate means such as a motor 491. It may be supported by known means such as rollers 492 and 493. It may furthermore be provided with a tensioning device such as a roller 494.

The table 110 further comprises a plate 140 having an aperture 145 encompassing the disc 120. The table surface comprises a second surface area 141 provided by the plate 140. The second surface area is substantially coplanar with the first surface area. In embodiments of the present invention, the second surface is substantially coplanar with the first surface area, both during translational movement and during rotation of the product. This means that in accordance with embodiments of the present invention no movement in a direction parallel to the axis of rotation of the disc 120 takes place. The array of spherical rollers comprises a second group of the spherical rollers 230 having their second contacting point 234 in contact with the second surface area 141.

Though a disc 120, fitting into an aperture of the plate 140, is preferred, it is understood that also other rotatable devices having other surface area shapes may be used.

The conveyor belt 400, being an endless conveyor belt, forms part of the means for bringing the product into contact with and for removing the product from the first surface of at least part of the group of spherical rollers having their second contact point contacting the planar surface of the disc, being the first surface area of the table surface.

The product to be rotated is brought to the apparatus 100 by e.g. a preceding conveyor belt 801. The product is brought into contact with the trailing end 410 of the conveyer belt 400, seen in translation direction 490. By rotation of the conveyer belt 400, the spherical rollers will rotate on the table surface, i.e. the first or second surface area of the substantially planar table surface. The first and second surface area of the table surface are at substantially the same level, i.e. they are coplanar. The product is pulled onto and over the conveyer belt 400, because the spherical rollers present at the trailing end 410 will rotate on the second surface area 141. This rotation of the spherical rollers will be converted into a translation of the product with respect to the conveyer belt 400. The product will translate in translation direction 490 with respect to the table at a speed which is twice the speed at which the belt moves relative to the table surface, provided there is slipless contact between table and rollers on the one hand, and between rollers and product on the other hand. The product to be rotated will gradually contact spherical rollers downstream the belt in translation direction.

When the product is positioned appropriately at a position along the table surface, i.e. the product contacts at least part of the first group of the array of spherical rollers by means of the first contacting points of these spherical rollers, which have their second contacting points contacting the planar surface of the disc, the conveyer belt is stopped.

By rotation of the disc, the product will be rotated in opposite direction on the conveyer belt. This is because the rotation of the disc is translated in a rotation of the spherical rollers, which in its turn is translated into a rotation of the product. In accordance with embodiments of the present invention, no movement of the disc in the longitudinal direction of the axis of rotation is required in order to allow for the rotation of the product. When slipless contact is provided between the first surface area, i.e. the surface of the disc, and the second contacting points of the spherical rollers, and between the first contacting points and the product, more particularly the lower side of the product, the rotation of the disc will be proportional to the rotation of the product. More particularly, the rotations will have an equal angle of rotation in absolute value, but have an opposite direction.

Once the rotation is finished, the conveyer belt is again driven in translation direction 490. The rotated product moves in translation direction again at twice the translation speed of the conveyer belt relative to the table surface, provided there is slipless contact between table and rollers on the one hand, and between rollers and product on the other hand. While discharging the rotated product from the spherical rollers, a new product to be rotated may already be brought in position above the disc.

As such the conveyer belt is used for bringing the product into contact with and remove the product from the first surface of at least part of the group of spherical rollers having a second surface positioned at the other side of the plane for contacting the planar surface of the disc.

The conveyer belt 400 may provide the rotated product to a next conveyer belt 802 further downstream the process in which the apparatus is incorporated.

The trailing edge of the conveyer belt in translation direction may be provided with a free area where the spherical rollers do not contact the table surface. During rotation of the disc, when the conveyer belt is not moving in translation direction, a new product to be rotated may already be provided to the free area. A preceding conveyer may push the product upon the free area. The product makes contact with the spherical rollers, which rollers may rotate freely in the cavities at this zone. Once the conveyer belt is driven in translation direction, the product present in the free area will be moved as set out above, while liberating the free area again. This has the advantage that the preceding conveyers may continue to rotate while the apparatus according to the present invention is allowed to fulfil its interrupted translational movement of the product to be rotated.

Turning to the different elements, the spherical rollers may be provided as part of a modular conveyer belt, such as an endless conveyer belt. The dimensions and materials of both the spherical rollers and the belt may vary according to the required specifications such as load to be carried, required friction coefficients and alike. A suitable belt was found to be a type 400 modular belt obtainable from Intralox (USA).

The spherical rollers are arranged with their centre substantially coplanar and according to an array which array may be characterised by rows and columns. However, the terms "array", "column" and "row" are used to describe sets of array elements which are linked together. The linking can be in the form of a Cartesian array of rows and columns; however, the present invention is not limited thereto. As will be understood by those skilled in the art, columns and rows can be easily interchanged and it is intended in this disclosure that these terms be interchangeable. Also, non-Cartesian arrays may be constructed and are included within the scope of the invention. Accordingly the terms "row" and "column" should be interpreted widely. To facilitate in this wide interpretation, there may be referred to "logically organised rows and columns". By this is meant that sets of spherical rollers are linked together in a topologically linear intersecting manner; however, that the physical or topographical arrangement need not be so.

As an example, spherical rollers may be arranged according to a Cartesian array of rows and columns, adjacent spherical rollers being on a centre-to-centre distance of 50 mm. Each spherical roller may have a diameter of 25.4 mm.

The dimensions of the disc and possibly the plate depend on the dimensions of the product to be oriented. As an example, an apparatus was provided having a disc with diameter of about 1700 mm and a plate in which a central aperture encompassing the disc was made. The plate was substantially rectangular having a dimension of about 2000 mm by 2000 mm. The disc was provided from plywood of 20 mm thickness provided with a layer of natural rubber which provides the first surface. The plate was provided from a metal sheet or from plywood, provided with a layer of rubber such as natural rubber. The plate provides the second surface being the surface provided with the rubber layer.

The rotational and translational speeds may vary depending on the application in which the apparatus is used. For orientation of stacks of sheet material such as stacks of paper or cardboard, translational speeds are preferably limited to less than or equal to 40 m per minute. As an example, rotation about an angle of 90° to 180° may be made in about 4seconds. For rotational speeds, the same limitation applies at the points of the stacks farthest remote from the axis of rotation. During rotation, the acceleration applied to the contact surfaces between spherical rollers and product to be rotated, should not cause the spherical rollers to slip relative to the product to be rotated. It was found that stacks of paper or cardboard up to 400 mm height and having an area of 1.6 m by 2.8 m at the lower side of the product, which area is to contact the spherical rollers, can be rotated. It is understood that the dimensions of the plate are to be made sufficiently large to allow products with these dimension, e.g. sheets with these dimensions, to rotate.

It is understood that the apparatus further may comprise a number of elements such as a means to rotate the disc, e.g. a motor such as a frequency controlled electromotor. This motor may be coupled to the disc by means of an appropriate gear box or similar means.

It is understood that the means to rotate the disc can be controlled by appropriate control means, which may control the speed and the angle over which the disc is rotated. The skilled person understands that the orientation of the product may be a rotation over an angle between 0° and 360°, such as for example 45°, 90°, 135°, 180°, 225°, 270° or 315° or any angle in between The orientation of consecutive products, i.e. the angle over which each product is rotated, may be either identical for each consecutive product passing the apparatus, or may differ between the products being oriented.

The apparatus may further comprise a means to check and adjust the angle of orientation, or means to monitor and tune the orientation of the product.

The apparatus may further comprise a driving means to drive the conveyer belt, such as a motor, e.g. a frequency controlled electromotor.

It is understood that the apparatus may comprise a control unit to monitor and control all movements of elements of the apparatus, based on implemented rules and schemes.

It is further understood that the apparatus, in embodiments thereof, may comprise more than one rotatable device. In such embodiments, the array of spherical rollers comprises additional groups of spherical rollers, the rollers of each group contacting the surface area of one of the rotatable devices with their second contacting point. This enables to convert a rotation of each of the rotatable devices into rotation of a product contacting the spherical rollers of the particular group of spherical rollers contacting the surface area of the rotatable device. As an example the apparatus may comprise two rotatable devices adjacent one to the other and positioned next to each other in a direction perpendicular to the production direction, e.g. the direction according to which a conveyer belt comprising the spherical rollers moves.

According to the second aspect of the invention, a method to orient a product is provided, which method comprises the step of providing a product orienting apparatus for orienting a product according to the first aspect of the present invention.

A product to be rotated about an axis perpendicular to the table surface, is brought into contact with the first contacting points of at least part of the first group of spherical rollers of the array. Then, the product is rotated in a first direction about an axis perpendicular to the table surface by rotating the rotatable disc in a direction opposite to the first direction while the second surface area of the disc contacts the second contacting points of at least part of the first group of spherical rollers. In accordance with embodiments of the present invention this rotation does not require any lifting of the product. In accordance with embodiments of the present invention, the rotation does not require any lifting of parts of the table. In particular, in accordance with embodiments of the present invention, the rotation does not require moving the disc with respect to the plate in a direction parallel to the longitudinal direction of the axis, e.g. between a translational movement and a rotational movement of the product.

The axis around which the product is rotated is identical to the axis of rotation of the disc. The angle of rotation of a product may vary in a range between 0° and 360°. The angle may be varied for different products, such as varied for consecutive products, or may be fixed, i.e. identical for all products.

The product may then be removed from at least part of the first group of spherical rollers. During removal of the rotated product, a next product to be rotated may already be brought into contact with the first contacting points of at least part of the first group of spherical rollers of the array.

This is in particular the case when the spherical rollers are part of a conveyor belt as set out for the embodiment as shown in FIG. 1.

The product to be rotated is brought into contact with the first surface of at least part of the first group of spherical rollers by moving the conveyor belt in a direction parallel to the table surface. When the spherical rollers, or at least part of the array of spherical rollers, make contact with the table surface by means of their second contact point, e.g. the surface area provided by the disc and possibly the surface area provided by the plate, the product contacting the spherical rollers will move along with the conveyor belt and will additionally move relative to the spherical rollers, and thus relative to the conveyor belt, with the same speed as the conveyer belt moves relative to the table surface. The product thus is translated on the conveyer belt at twice the translation speed of the conveyer belt itself.

As an alternative, the apparatus may comprise a means for breaking the contact between the second contacting points of the spherical rollers and the table surface prior to having the conveyer belt make translation movement in a plane parallel to the table surface. For example, the apparatus may comprise a means to lift the conveyer belt relative to the table surface. When the conveyer belt is moved, the product resting on the conveyer belt moves along with the conveyer belt. The apparatus may comprise mans to support the conveyer belt once lifted.

Other arrangements for accomplishing the objectives of the method embodying the invention will be obvious for those skilled in the art.

Figure 3:
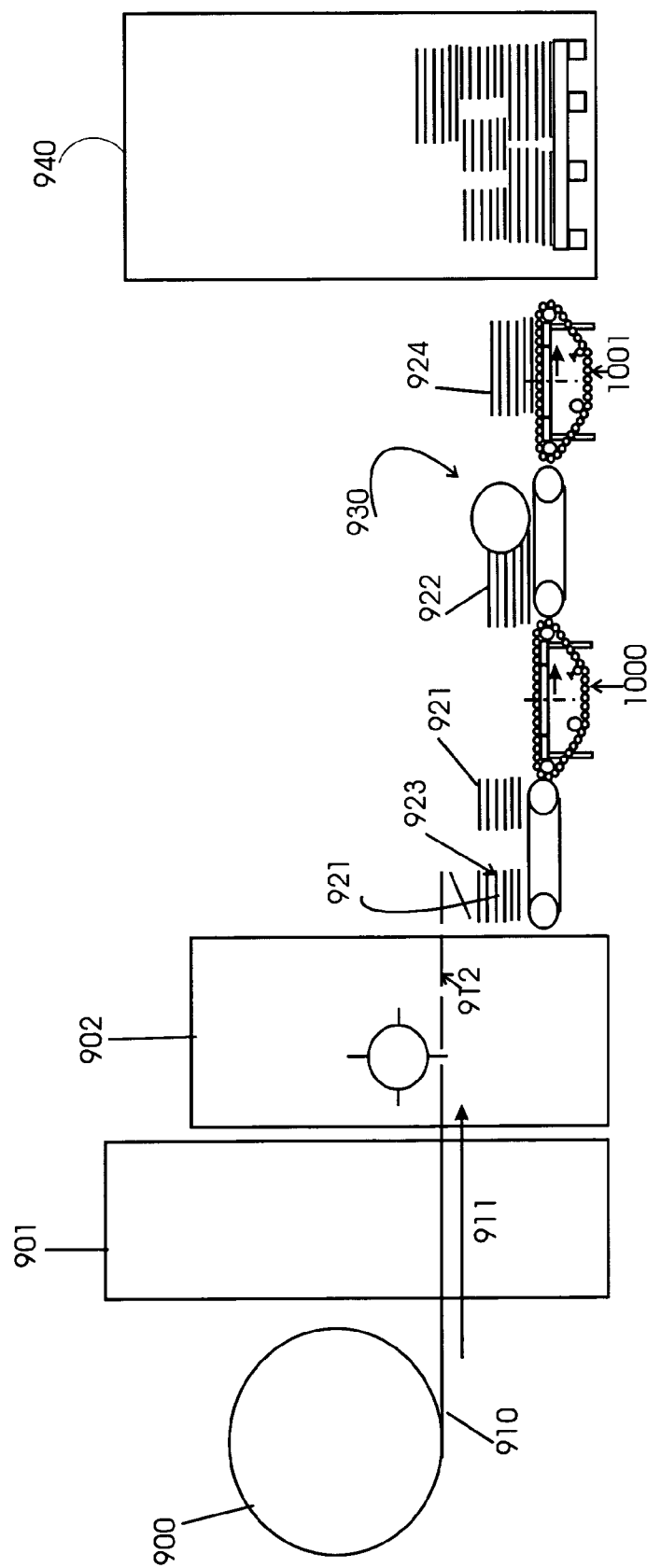
FIG. 3 is a schematical view of a paper or cardboard processing line in which product orienting apparatuses of FIG. 1 are integrated.

As shown in FIG. 3, the apparatus 100 as shown in FIG. 1 may be incorporated in a production line of e.g. stacks of sheet material, e.g. stacks of sheets of paper or cardboard. As an example, the production line in FIG. 3 comprises a coil of paper or cardboard 900, being a coiled sheet 910 of paper or cardboard. The sheet is e.g. printed on one or both sides and is given its form and shape in operation 901.

In station 902, being a breaker, the endless sheet is partially cut in a direction perpendicular to the moving direction 911, providing a linear but interrupted cut 912 interrupted by a number of non-cut parts, which maintain the link between consecutive sheets. The sheets are piled in a zigzag way, using the linear cut line as fold line, providing a stack 921 of paper or cardboard sheets. At the sides 923, the sheets are still linked to each other by the non-cut parts.

In order to use a continuous cutter machine 930 for removing the non-cut parts, the product, being a stack of sheets, is to be rotated about 90°. This is done by the product orienting apparatus 1000 according to the present invention.

Once the product is rotated, a rotated stack 922 of sheets of paper or cardboard is obtained, which stacks are fed to the cutting machine 930 removing the non-cut parts. A stack of sheets 924 is now obtained, comprising individualised sheets. A second product orienting apparatus 1001 according to the present invention is incorporated after the cutting machine 930, which orients the stacks 924 to facilitate easy and correct palletizing of the stacks in a palletizing machine 940, for shipment or transport to further production processes. According to the palletizing system, consecutive stacks 924 may be rotated using different angels of rotation, dependent on the position the stack is to take on the pallet being formed.

The above-mentioned production line is merely an example of possible processes in which the product orienting apparatus according to embodiments of the present invention may be integrated. Other arrangements for accomplishing the use of the product orienting apparatuses of the present invention will be obvious for those skilled in the art.

It is to be understood that although preferred embodiments, specific constructions and configurations, as well as materials, have been discussed herein for apparatuses according to the present invention, various changes or modifications in form and detail may be made without departing from the scope and spirit of this invention. Steps may be added or deleted to methods described within the scope of the present invention.

The invention claimed is:

1. A product orienting apparatus for orienting a product, the apparatus comprising:
   a table comprising a rotatable device, the table having a table surface comprising at least a first surface area being provided by the rotatable device, the rotatable device being rotatable about an axis substantially perpendicular to the table surface;
   an array of substantially identical spherical rollers, each spherical roller being suitable for contacting the product at a first contacting point of the spherical roller and for contacting the table surface with a second contacting point of the spherical roller, the array of spherical rollers comprising a first group of spherical rollers contacting the surface area of the rotatable device with their second contacting point thereby enabling to convert a rotation of the rotatable device into rotation of a product contacting the spherical rollers of the first group of spherical rollers; and
   a plate having an aperture encompassing the rotatable device,
   wherein the table surface comprising a second surface area provided by the plate, which second surface area is substantially coplanar with the first surface area, and wherein rotation of the product does not require vertically moving the rotatable device with respect to the table.

2. A product orienting apparatus as in claim 1, wherein the spherical rollers are rotatably fixed in the aperture to keep the centres of the spherical rollers in a fixed position relative to the axis of rotation of the rotatable device during rotation of the rotatable device.

3. A product orienting apparatus as in claim 1, wherein the apparatus comprises a conveyer belt to bring the product into contact with the first contacting point of at least part of the first group of spherical rollers having the second contacting point contacting the planar surface of the rotatable device when being brought into contact with the product.

4. A product orienting apparatus as in claim 1, wherein the apparatus furthermore comprises a conveyer belt to remove the product from at least part of the first group of spherical rollers.

5. A product orienting apparatus as in claim 1, wherein the spherical rollers are part of a conveyor belt, each spherical roller of the array of spherical rollers being rotatably retained in a cavity in the belt, the first and second contacting points of the spherical rollers being provided by salient parts of the spheres.

6. A product orienting apparatus as in claim 5, wherein the conveyor belt is an endless belt moveable in a direction parallel to the table surface.

7. A product orienting apparatus as in claim 1, wherein the array of spherical rollers comprises a second group of the spherical rollers having their second contacting point for contacting the second surface area.

8. A product orienting apparatus as in claim 1, wherein the rotatable device is a disc.

9. A method to orient a product, the method comprising the steps of:
   providing a product orienting apparatus for orienting a product, the product orienting apparatus comprising:
   a table comprising a rotatable device, the table having a table surface comprising at least a first surface area being provided by the rotatable device, the rotatable device being rotatable about an axis substantially perpendicular to the table surface;
   an array of substantially identical spherical rollers, each spherical roller being suitable for contacting the product at a first contacting point of the spherical roller and for contacting the table surface with a second contacting point of the spherical roller, the array of spherical rollers comprising a first group of spherical rollers contacting the surface area of the rotatable device with their second contacting point thereby enabling to convert a rotation of the rotatable device into rotation of a product contacting the spherical rollers of the first group of spherical rollers; and a plate having an aperture encompassing the rotatable device, wherein the table surface comprising a second surface area provided by the plate, which second surface area is substantially coplanar with the first surface area, and wherein rotation of the product does not require vertically moving the rotatable device with respect to the table;

bringing a product, to be rotated about an axis perpendicular to the table surface, into contact with the first contacting points of at least part of the first group of spherical rollers of the array;

rotating the product in a first direction about an axis perpendicular to the table surface by rotating the rotatable device in a direction opposite to the first direction while the second surface area of the device contacts the second contacting points of at least part of the first group of spherical rollers.

10. A method according to claim 9, wherein the spherical rollers are part of a conveyor belt, each spherical roller of the array of spherical rollers being rotatably retained in a cavity in the belt, the first and second contacting points of the spherical rollers being provided by salient parts of the spheres, the method further comprising that the product to be rotated is brought into contact with the first surface of at least part of the first group of spherical rollers by moving the conveyor belt in direction parallel to the table surface.

11. A method according to claim 10, wherein the array of spherical rollers comprising a second group of the spherical rollers having their second contacting point for contacting the second surface area, the method comprising moving the conveyor belt while the table surface contacts at least part of the array of spherical rollers.

12. A method according to claim 9, wherein the product is a stack of sheet material.

13. A method according to claim 9, wherein the product is a stack of sheets of paper or cardboard.

* * * * *